(12) United States Patent
Fujiwara et al.

(10) Patent No.: US 6,977,660 B2
(45) Date of Patent: Dec. 20, 2005

(54) DATA PROCESSING APPARATUS

(75) Inventors: Koichi Fujiwara, Otsu (JP); Eiro Fujii, Takatsuki (JP)

(73) Assignee: Minolta Co., Ltd., Osaka (JP)

( * ) Notice: Subject to any disclaimer, the term of this patent is extended or adjusted under 35 U.S.C. 154(b) by 326 days.

(21) Appl. No.: 10/303,732

(22) Filed: Nov. 26, 2002

(65) Prior Publication Data

US 2003/0098868 A1   May 29, 2003

(30) Foreign Application Priority Data

Nov. 29, 2001 (JP) ............................ P2001-364756

(51) Int. Cl.[7] .............................................. G09G 5/00
(52) U.S. Cl. ...................... 345/582; 345/419; 345/420
(58) Field of Search ................................ 345/419–421, 345/582–588

(56) References Cited

U.S. PATENT DOCUMENTS 6,664,956 B1 *  12/2003  Erdem ......................... 345/419
6,756,990 B2 *   6/2004  Koller ......................... 345/582
6,768,492 B2 *   7/2004  Dorbie et al. ................ 345/582

FOREIGN PATENT DOCUMENTS

JP              10-283487           10/1998

* cited by examiner

*Primary Examiner*—Matthew C. Bella
*Assistant Examiner*—Po-Wei (Dennis) Chen
(74) *Attorney, Agent, or Firm*—McDermott Will & Emery LLP

(57) ABSTRACT

An object of the present invention is to realize a technique capable of generating a texture image from all of polygons constructing a three-dimensional shape model without a dropout and a texture image on which an editing or correcting operation can be easily performed. When a computer reads original three-dimensional model data 51, an original three-dimensional model is set in a virtual model space, and a cylindrical plane is set as a projection plane around the original three-dimensional model. A virtual projection computing unit 14 functions to virtually project a texture image corresponding to a polygon which can be projected onto the projection plane, thereby generating a projected texture image. On the other hand, by individually extracting a unit texture image corresponding to a polygon which cannot be projected onto the projection plane, thereby generating an unprojected texture image.

12 Claims, 16 Drawing Sheets

F I G . 4
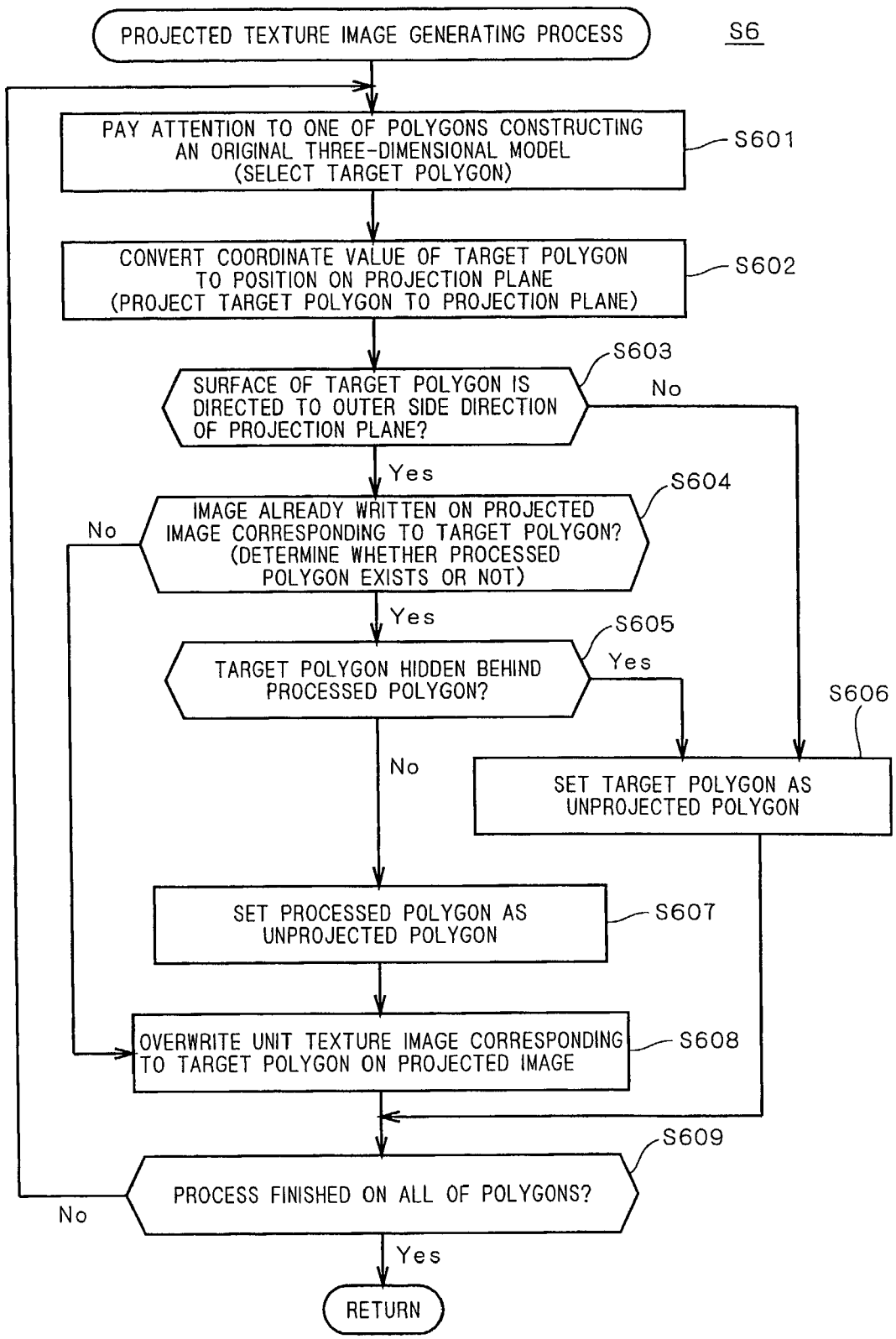

F I G . 8
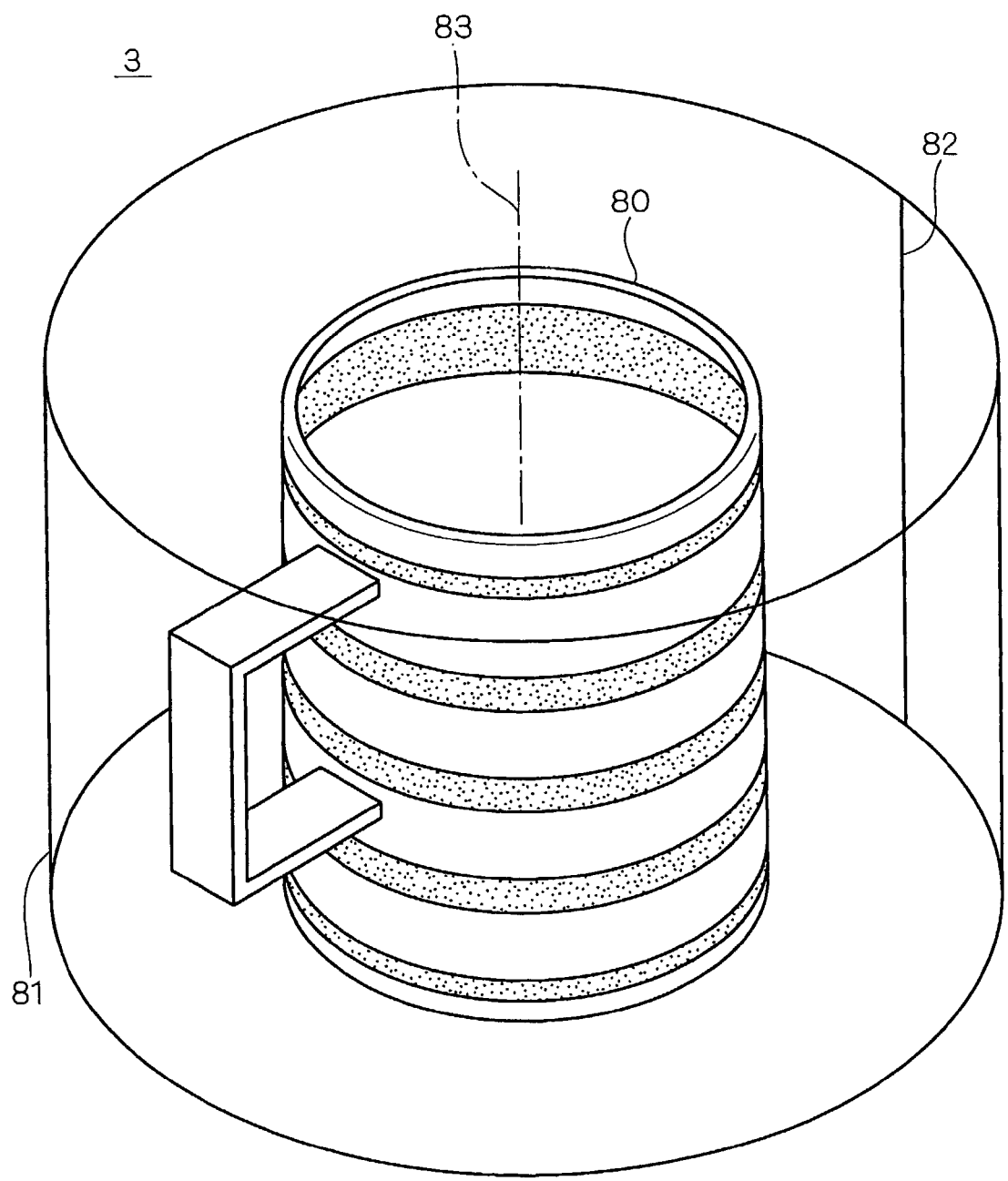

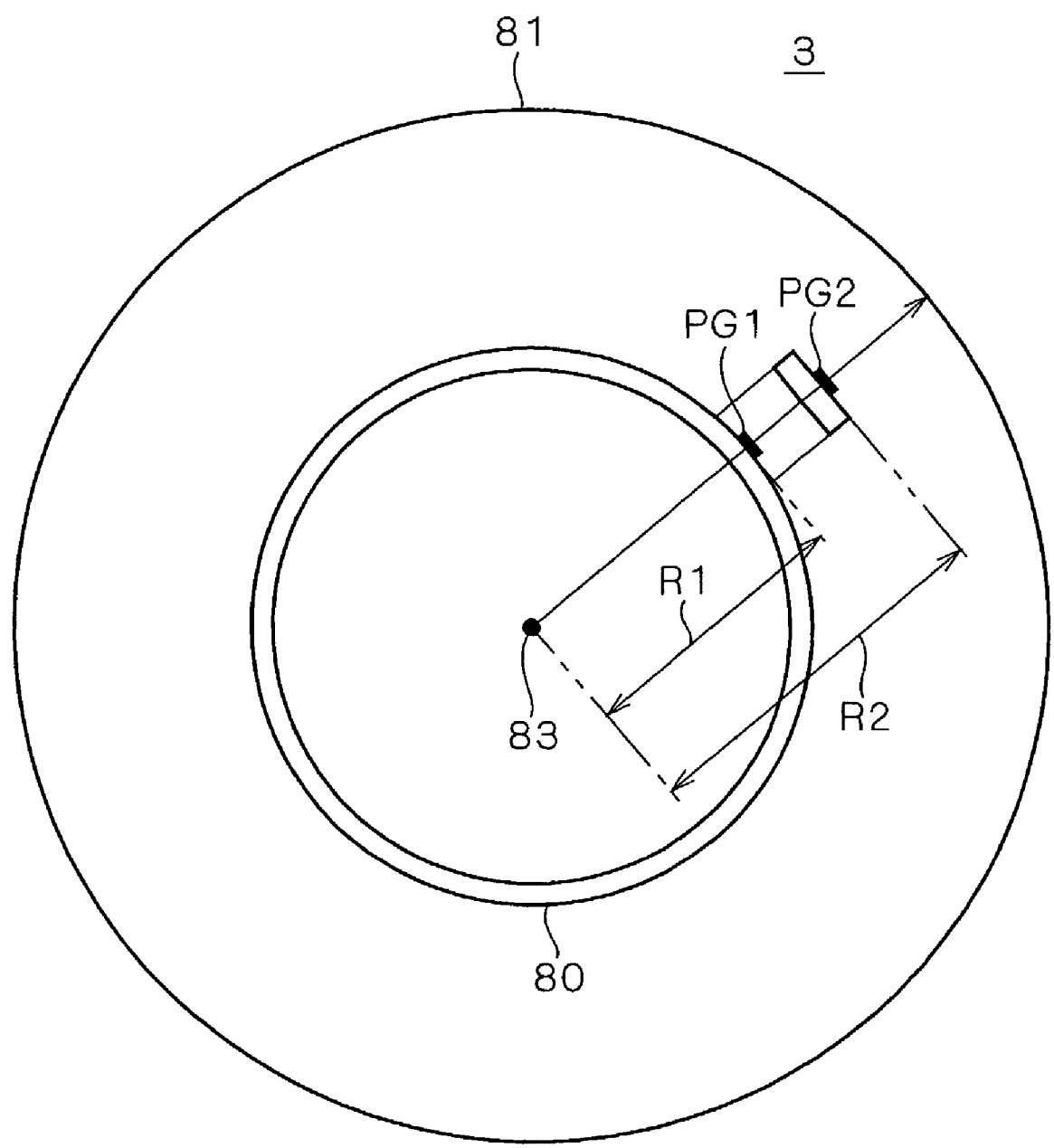

F I G . 1 1
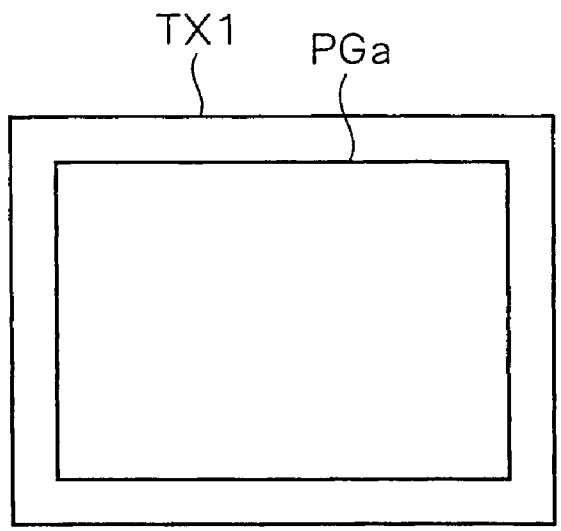
F I G . 1 2
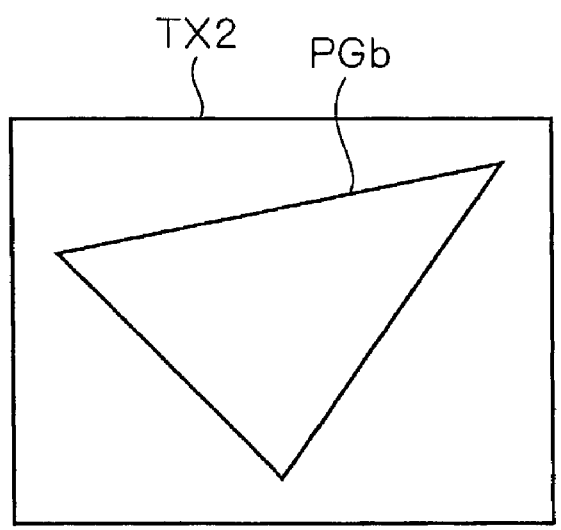

F I G . 1 4
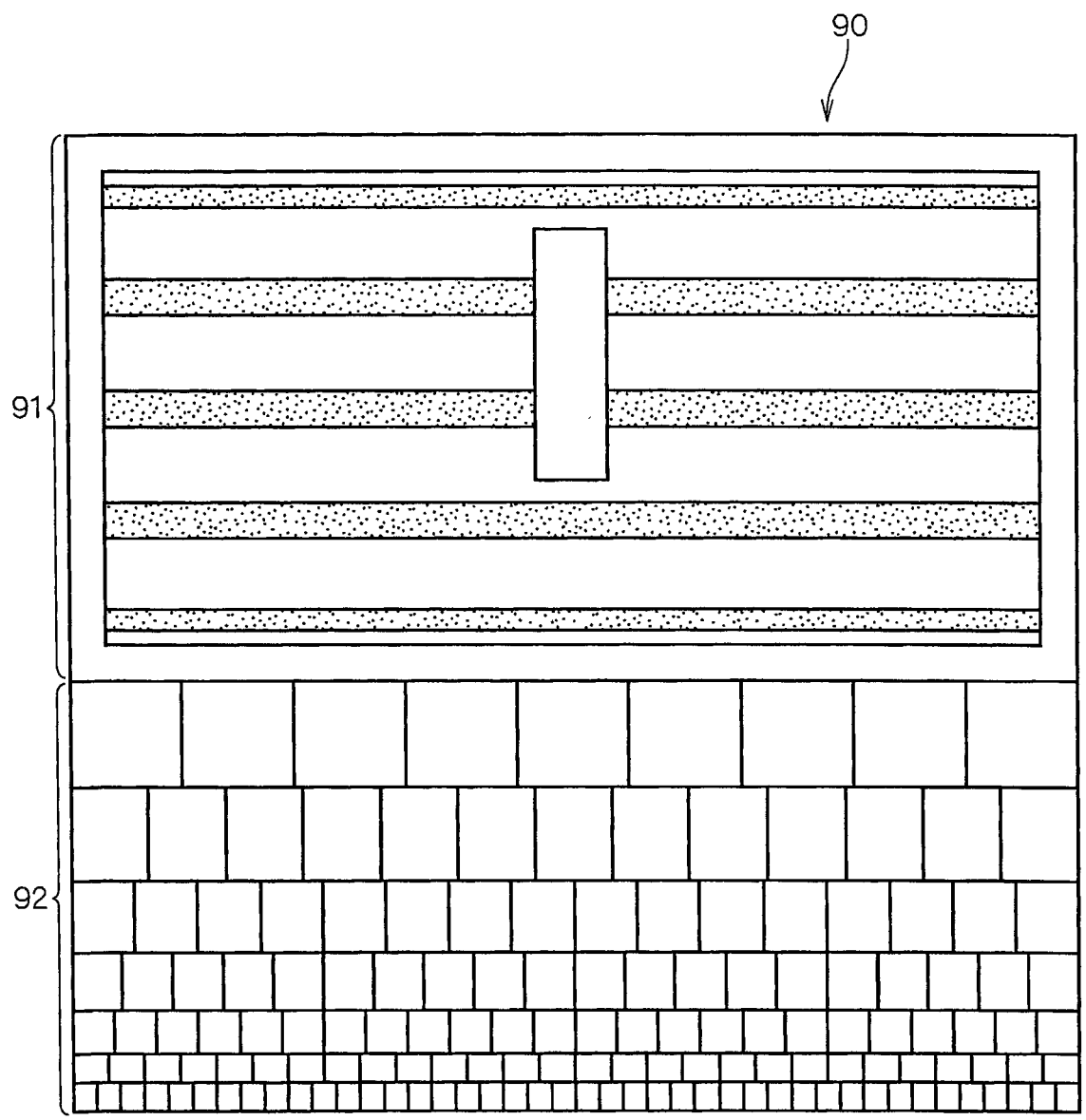

F I G . 1 5
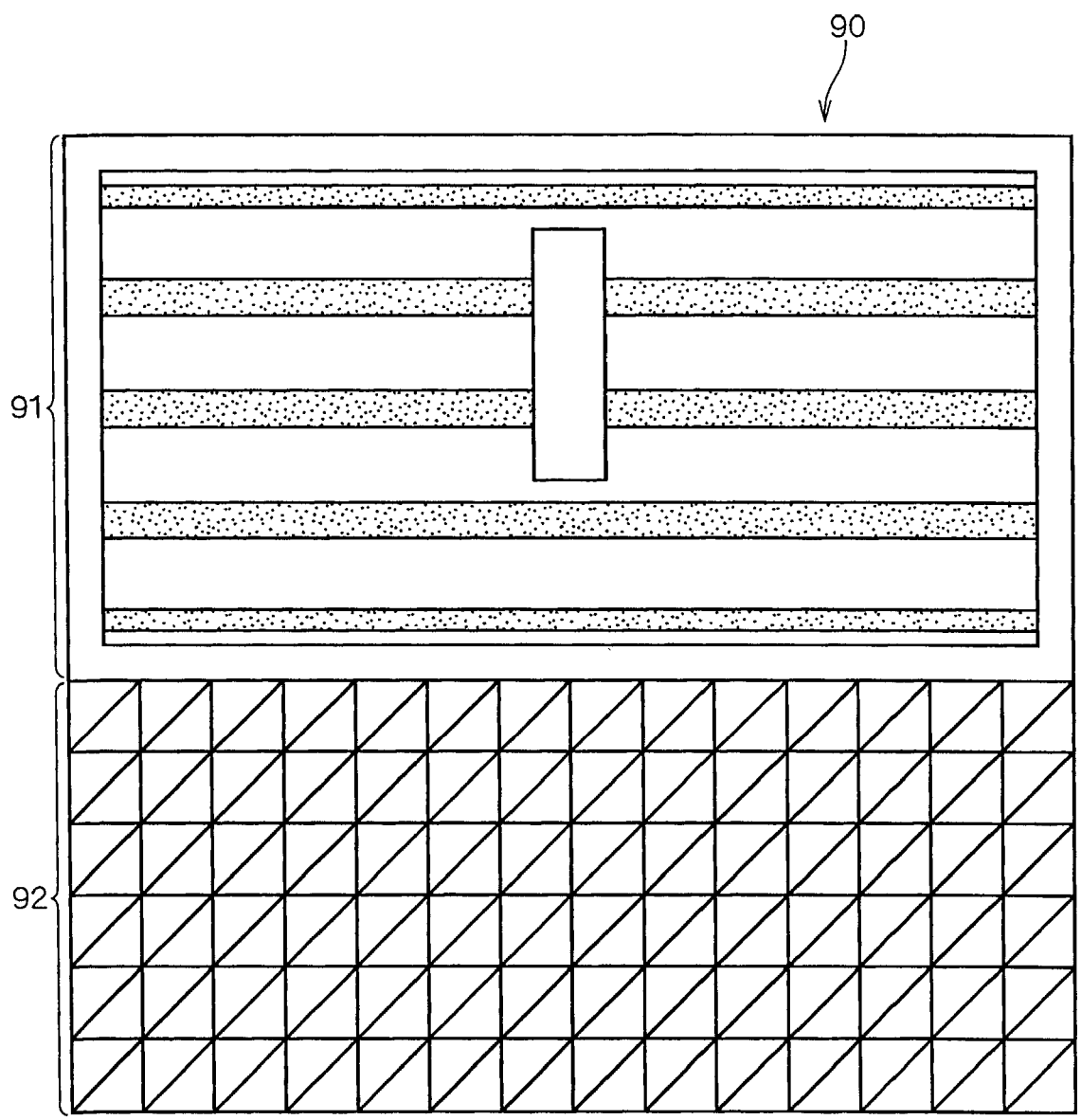

F I G . 1 6
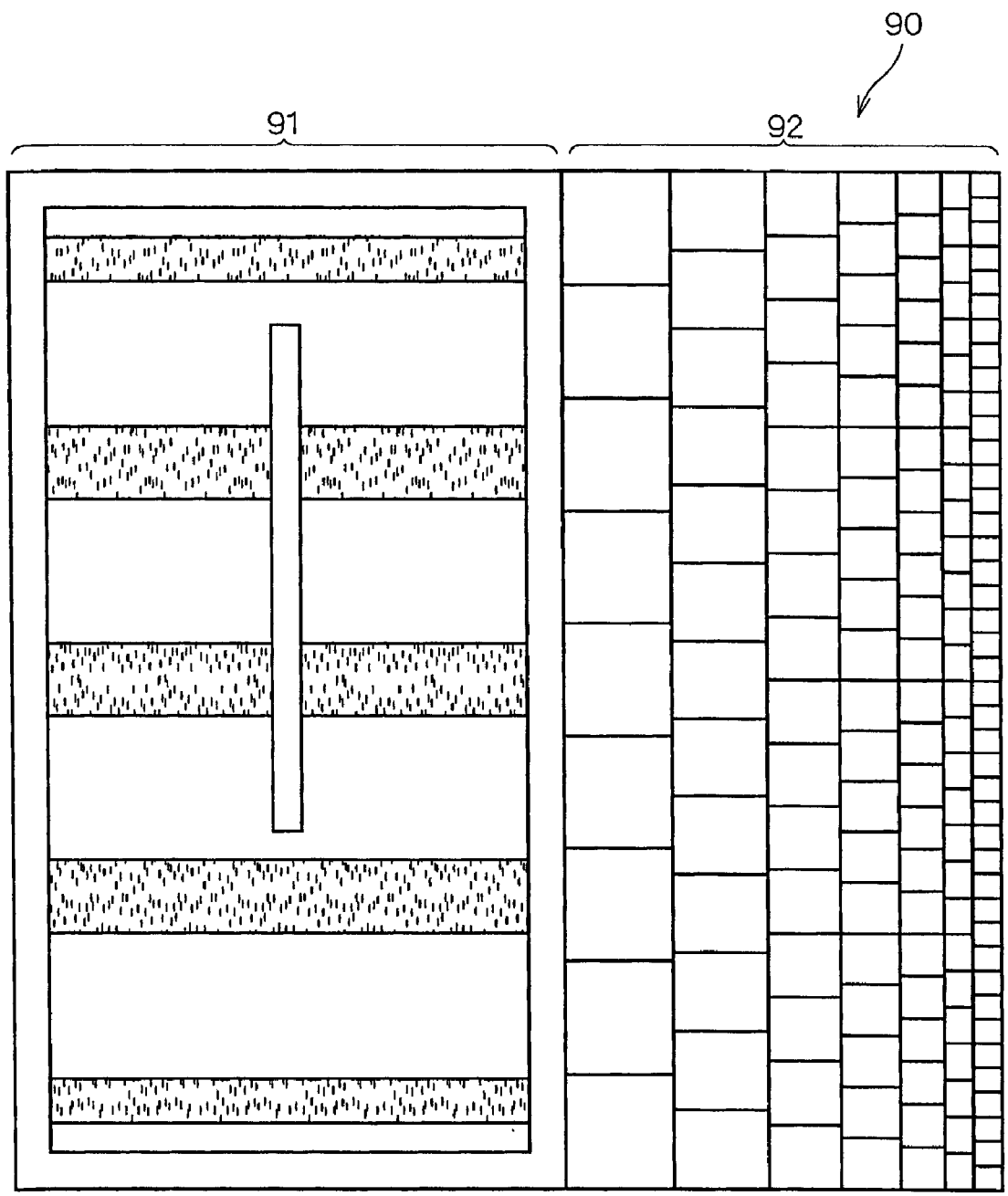

DATA PROCESSING APPARATUS

This application is based on application No. 2001-364756 filed in Japan, the contents of which are hereby incorporated by reference.

BACKGROUND OF THE INVENTION

1. Field of the Invention

The present invention relates to a three-dimensional image processing technique of generating a texture image from an original three-dimensional model by means of computer processing.

2. Description of the Background Art

In three-dimensional image processing, at the time of adding data of a pattern or the like to the surface of a three-dimensional shaped model, a method which is so-called texture mapping is employed. The texture mapping is performed generally by associating each of a number of polygons constructing a three-dimensional shaped model with a texture image as a two-dimensional image. Consequently, at the time of performing the texture mapping, it is desired to preliminarily generate texture images corresponding to the parts of a three-dimensional model.

There are mainly two conventional methods of generating a texture image.

In the first method, a cylindrical plane is set around a three-dimensional model on which a pattern or the like is formed, and the pattern on the surface of the three-dimensional model is projected onto the cylindrical plane, thereby generating a texture image as a two-dimensional image.

In the second method, a micro texture image assigned to each of polygons (hereinafter, referred to as an "unit texture image") is extracted in a form so as to correspond to each polygon shape, and micro texture images are arranged in a plane, thereby generating a texture image as a two-dimensional image.

The conventional texture image generating methods, however, have the following problems.

First, in the case of the first method, all of the parts of a three-dimensional model cannot always be projected onto the cylindrical plane which is set around the three-dimensional model. Consequently, the first method has such a problem that a texture image cannot be generated for a polygon which is in the shade when seen from the cylindrical plane, and cannot be projected.

In the case of the second method, since the unit texture images corresponding to the polygons, which are arranged in a plane, become a texture image, there is the possibility that an image dropout occurs around a boundary of polygons at the time of adding the unit texture images to the polygons. Consequently, in the case of the second method, it is necessary to prevent the dropout around the boundary of polygons by setting the size of each unit texture image to be slightly larger than the size of a corresponding polygon. However, when unit texture images each having a size larger than the polygon size are held for all of polygons constructing a three-dimensional shaped model, a problem such that the size of a whole texture image becomes large arises.

Further, the second method has such a problem that, since the unit texture images arranged in a plane become a texture image, even if the whole texture image is displayed, it is difficult to grasp the general pattern or the like of the three-dimensional model. Consequently, when the user tries to perform an image correcting process or the like on the texture image by activating image processing software or the like, the user cannot grasp the whole image of the three-dimensional model, so that a problem arises such that it is difficult to perform a general correcting work.

SUMMARY OF THE INVENTION

The prevent invention is directed to a data processing apparatus for generating a texture image from an original three-dimensional model.

According to the present invention, the data processing apparatus includes a projection plane setting unit for setting a projection plane on which an original texture image of the original three-dimensional model is to be projected in a virtual model space of the original three-dimensional model, an image computing unit for generating a projected texture image by virtually projecting a part which can be projected onto the projection plane, in the original texture image onto the projection plane and generating an unprojected texture image by extracting a part which cannot be projected onto the projection plane, in the original texture image, and an image placing unit for associating the projected and unprojected texture images with each other.

Consequently, a complete texture image of an original three-dimensional model can be generated while the data amount of the texture image is reduced. Further, it is possible to generate a texture image on which an editing operation and a correcting operation can be easily performed by the user.

According to one aspect of the present invention, the image placing unit associates the projected and unprojected texture images with each other by placing the projected and unprojected texture images so as to adjacent to each other.

At the time of associating the unprojected and projected texture images with each other, therefore, the unprojected and projected texture images are placed so as to be adjacent to each other. Thus, management of the texture image is facilitated.

According to another aspect of the present invention, the data processing apparatus further includes an operation input unit for setting a generating condition at the time of generating the texture image, the generating condition including settings regarding the projection plane and resolution at the time of virtually projecting the original three-dimensional model. When resolution, at the time of virtually projecting the original three-dimensional model onto the projection plane by the operation input unit, is set, the image placing unit changes a position, in which the unprojected texture image is placed relative to the projected texture image, in accordance with the set resolution.

With the configuration, the placement position of the unprojected texture image relative to the projected texture image is changed in accordance with the resolution at the time of image placement. Consequently, a texture image of a form in accordance with the projected texture image to be generated can be generated.

According to still another aspect of the present invention, the data processing apparatus further includes a display unit for receiving the projected and unprojected texture images which are associated with each other from the image placing unit, and displaying the projected and unprojected texture images.

According to yet another aspect of the present invention, the data processing apparatus further includes a recording medium input/output unit for receiving the projected and unprojected texture images which are associated with each other from the image placing unit, and storing the projected and unprojected texture images into a recording medium.

According to yet another aspect of the present invention, the data processing apparatus further includes a communication interface connected to an external computer via a network. The communication interface receives the projected and unprojected images which are associated with each other from the image placing unit and transmits the projected and unprojected texture images to the external computer via the network.

The present invention is also directed to a computer-readable program product for generating a texture image from an original three-dimensional model.

According to the present invention, the program product includes the instructions of: setting a projection plane on which an original texture image of the original three-dimensional model is to be projected in a virtual model space of the original three-dimensional model; generating a projected texture image by virtually projecting a part which can be projected onto the projection plane, in the original texture image onto the projection plane; generating an unprojected texture image by extracting a part which cannot be projected onto the projection plane, in the original texture image; and associating the projected and unprotected texture images with each other.

The present invention is further directed to texture image data generated from an original three-dimensional model.

According to the present invention, the texture image data includes: a projected texture image generated by virtually projecting a projectable part of an original texture image of the original three-dimensional model onto a projection plane set in a virtual model space of the original three-dimensional model; and an unprojected texture image generated by extracting a part which cannot be projected onto the projection plane, in the original texture image, thereby obtaining a data structure that the projected and the unprojected texture images are associated with each other.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a flowchart showing the sequence of the texture image generating process;

FIG. 8 is a diagram showing an example of a cylindrical plane which is set for a three-dimensional model;

FIG. 10 is a diagram showing the concept of a hidden surface determining process;

FIG. 11 is a diagram showing the concept of extraction of a texture image corresponding to an unprojected polygon;

FIG. 12 is a diagram showing an example of the concept of extraction of a texture image corresponding to an unprojected polygon;

FIG. 14 is a diagram showing an example of layout of a projected texture image and an unprojected texture image;

FIG. 15 is a diagram showing an example of layout of a projected texture image and an unprojected texture image;

FIG. 16 is a diagram showing an example of layout of a projected texture image and an unprojected texture image;

DESCRIPTION OF THE PREFERRED EMBODIMENTS

Hereinafter, embodiments of the present invention will be described in detail with reference to the drawings.

Figure 1:
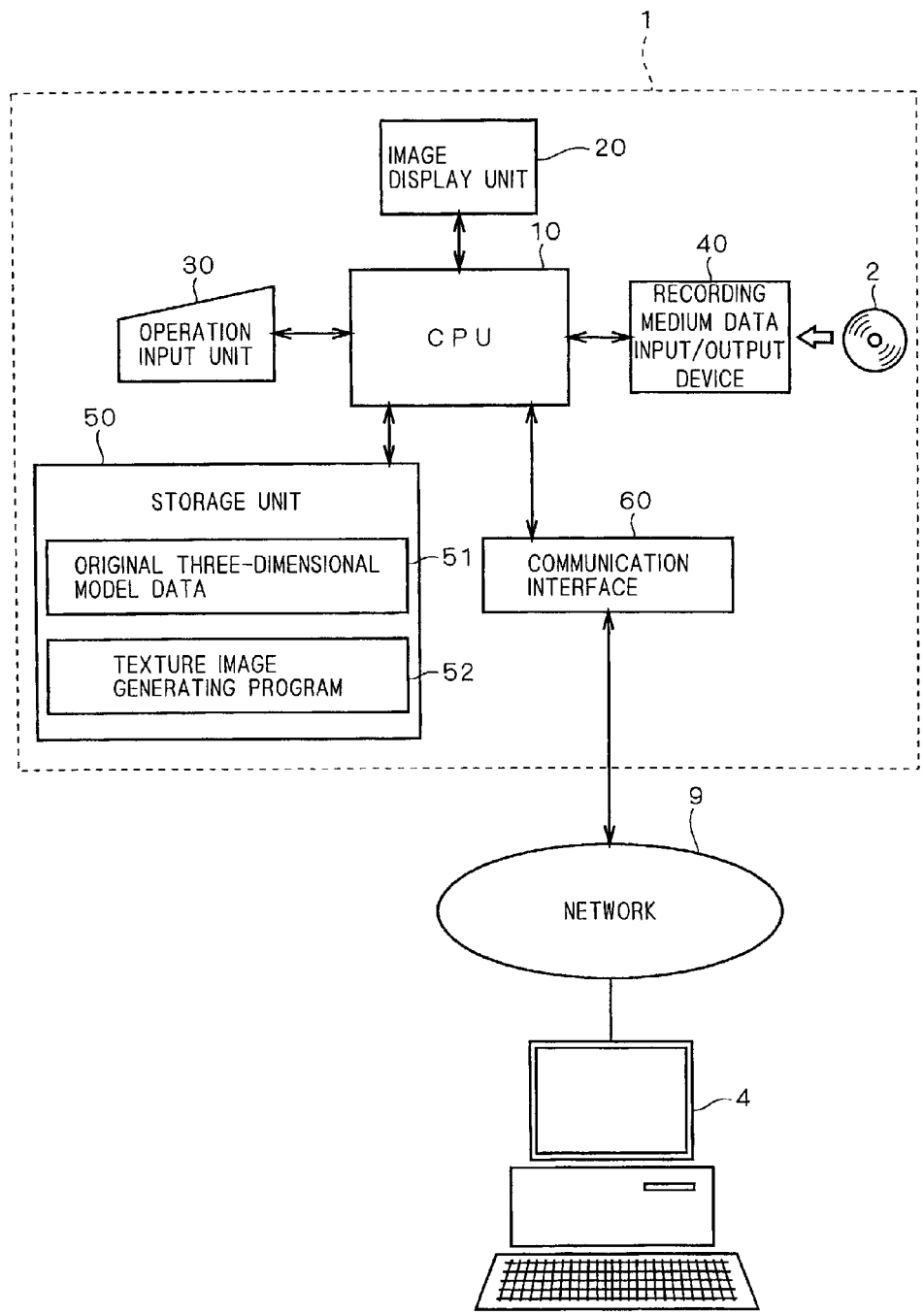
FIG. 1 is a diagram showing the configuration of a three-dimensional data processing apparatus.

FIG. 1 is a diagram showing the configuration of a three-dimensional data processing apparatus 1 according to an embodiment of the present invention. The three-dimensional data processing apparatus 1 has, in a manner similar to a general computer, a CPU 10 for executing a program to thereby perform a computing process based on a sequence specified by the program, an image display unit 20 for displaying an image supplied from the CPU 10, an operation input unit 30 constructed by a keyboard, a mouse and the like used by the user in order to perform an operation of inputting information, a recording medium data input/output device 40 for inputting/outputting data from/to a recording medium 2 such as a CD-ROM or DVD-ROM, a storage unit 50 taking the form of a semiconductor memory or a magnetic disk drive, and a communication interface 60 for performing data communication with an external computer 4 via a network 9 such as the Internet.

In the storage unit 50, original three-dimensional model data 51, a texture image generating program 52 and the like are prestored. The data or program is prestored in the storage unit 50 in such a manner that the CPU 10 preliminarily reads the data or program from the recording medium 2 and performs an operation of installing or storing the data or program into the three-dimensional data processing apparatus 1. Also, the data or program can be prestored in such a manner that the CPU 10 performs data communication with the external computer 4 via the communication interface 60.

The original three-dimensional model data 51 is data which specifies a three-dimensional model to be processed when the CPU 10 executes the texture image generating program 52 in the embodiment. The texture image generating program 52 is a program which is read and executed by the CPU 10, thereby making the three-dimensional data processing apparatus 1 function as a texture image generating apparatus.

In the embodiment, when the CPU 10 executes the texture image generating program 52 in the three-dimensional data processing apparatus 1, a new texture image is generated from the original three-dimensional model data 51 stored in the storage unit 50. When a plurality kinds of original three-dimensional data 51 is stored in the storage unit 50, the CPU 10 reads the original three-dimensional model data 51 designated by the user via the operation input unit 30, and performs a data process on the original three-dimensional model.

Concretely, in the three-dimensional data processing apparatus 1 of the embodiment, the original three-dimensional model data 51 is read, the original three-dimensional model is set in a virtual model space, and a projection plane is set so as to surround the original three-dimensional model disposed in the virtual model space. In the case where a polygon as a component of the original three-dimensional model can be projected onto the projection plane set in the virtual model space, by virtually projecting a texture image corresponding to the polygon onto the projection plane, a projected texture image is generated. On the other hand, among a plurality of polygons constructing the original three-dimensional model, a polygon which is in the shade of another polygon and cannot be projected onto the projection plane exists. In this case, the three-dimensional data processing apparatus 1 extracts all of unit texture images corresponding to polygons which cannot be projected, and generates an unprojected texture image consisting of a plurality of unit texture images. After that, by associating the projected texture image and the unprojected texture image with each other, the projected texture image and the unprojected texture image are integrated. In such a manner, a process of generating a new texture image for expressing a surface pattern or the like of the three-dimensional model is realized.

Figure 2:
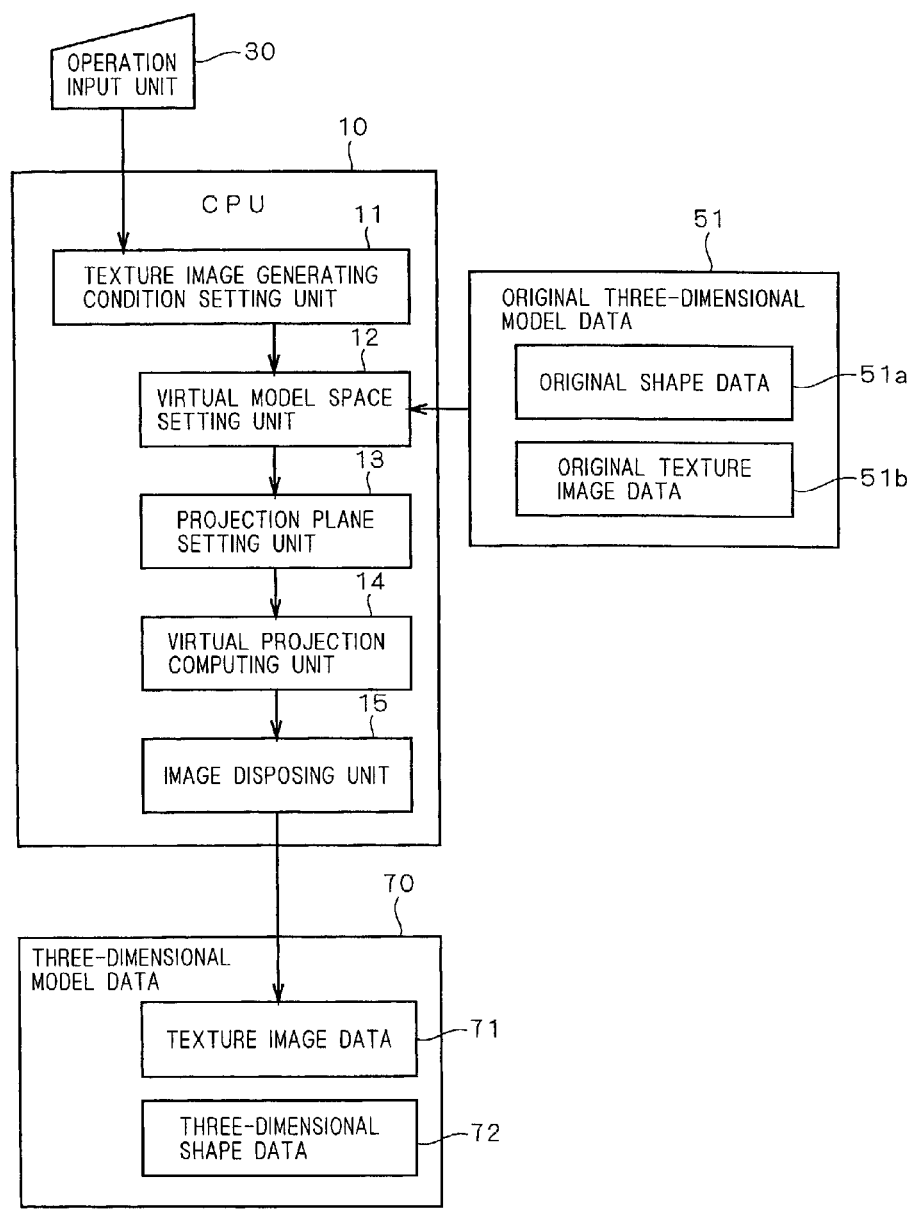
FIG. 2 is a diagram showing functions realized by a CPU of the three-dimensional data processing apparatus.

FIG. 2 is a diagram showing functions realized by the CPU 10 when the texture image generating program 52 is executed in the three-dimensional data processing apparatus 1. As shown in FIG. 2, the CPU 10 of the three-dimensional processing apparatus 1 executes the texture image generating program 52, thereby functioning as a texture image generating condition setting unit 11, a virtual model space setting unit 12, a projection plane setting unit 13, a virtual projection computing unit 14, and an image disposing unit 15.

As shown in FIG. 2, the original three-dimensional model data 51 includes original shape data 51a and original texture image data 51b.

The original texture image data 51b is, for example, image data constructed by a plurality of two-dimensional images.

The original shape data 51a is shape data expressing the surface shape of the original three-dimensional model. The surface shape of the three-dimensional model is expressed by a plurality of polygons, and each polygon expresses the surface shape in each position in the three-dimensional model. Consequently, in the original shape data 51a, polygon information of each polygon is set.

Each polygon information of the original shape data 51a expresses the surface shape of a three-dimensional shape, and each polygon information includes information (texture specifying information) for specifying a part of a texture image in order to show the surface pattern or the like of each polygon. Therefore, when one polygon is specified in the original three-dimensional model, a part of the corresponding texture image is specified.

As shown in FIG. 2, the texture image generating condition setting unit 11 sets a generating condition of generating a texture image on the basis of input information from the operation input unit 30 or by analyzing the original three-dimensional model data 51. Examples of conditions to be set include a setting of a projection plane on which an original three-dimensional model is to be virtually projected and a setting of resolution at the time of virtually projecting an original three-dimensional model. A layout of unit texture images corresponding to polygons which cannot be projected onto the projection plane is also set. In the case where the resolution of virtual projection is set, the layout of unit texture images is changed according to the resolution. Further, in the case where a cylindrical plane is selected as a projection plane, the conditions also include designation of the axis of a cylinder and an end portion of the projection plane.

The conditions set by the texture image generating condition setting unit 11 are given to each of the virtual model space setting unit 12, projection plane setting unit 13, virtual projection computing unit 14, and image disposing unit 15.

The virtual model space setting unit 12 sets an original three-dimensional model in a virtual three-dimensional model space (virtual model space) on the basis of the conditions obtained from the texture image generating condition setting unit 11.

When the projection plane setting unit 13 functions, according to the conditions set by the texture image generating condition setting unit 11, the projection plane setting unit 13 sets a projection plane around the original three-dimensional model which is virtually set in the virtual model space. In the following description, a case where the cylindrical plane is set as the projection plane will be taken as an example.

Subsequently, the virtual projection computing unit 14 functions, determines whether each of the plurality of polygons constructing the original three-dimensional model in the virtual model space can be projected or not, extracts a unit texture image corresponding to the polygon which can be projected from the original texture image, and virtually projects the unit texture image onto the projection plane, thereby forming a projected texture image on the projection plane. The projected texture image which is finally generated by the virtual projection computing unit 14 is given to the image disposing unit 15. The projected texture image is a two-dimensional image obtained by developing a projection image which is set on the cylindrical plane as the projection plane to an image in a plane.

The virtual projection computing unit 14 extracts a unit texture image corresponding to each of the polygons determined as polygons which cannot be projected. At this time, the virtual projection computing unit 14 extracts a unit texture image in a size larger than that of a polygon which cannot be projected. It can prevent a dropout of an image around the boundary of polygons from occurring at the time of pasting the unit texture images to polygons.

The virtual projection computing unit 14 supplies the unit texture image extracted every polygon which cannot be projected to the image disposing unit 15.

When a plurality of unit texture images corresponding to polygons which cannot be projected are inputted from the virtual projection computing unit 14, the image disposing unit 15 disposes the plurality of unit texture images on the basis of the layout which is set in the texture image generating condition setting unit 11, thereby generating an unprojected texture image. The image disposing unit 15 disposes the projected texture images and the unprojected texture images on the basis of the layout which is set in the texture image generating condition setting unit 11, thereby generating a texture image as one two-dimensional image. In other words, the texture image generated by the image disposing unit 15 is in a state where the projected texture images formed by being projected on the virtual projection plane and the unprojected texture images which are not projected on the projection plane are associated with each other as one two-dimensional image.

The image disposing unit 15 outputs texture image data in which the projected texture images and the unit texture images are associated with each other as one two-dimensional image. At this time, the image disposing unit 15 outputs the texture image to the storage unit 50, image displaying unit 20, recording medium data input/output device 40, or communication interface 60. In the case where the texture image data is outputted to the storage unit 50, the texture image data is stored in the storage unit 50. In the case where the texture image data is outputted to the image display unit 20, the texture image is displayed on the display screen of the image display unit 20. In the case where the texture image data is outputted to the recording medium data input/output device 40, the texture image data is stored in the recording medium 2. Further, in the case where the texture image data is outputted to the communication interface 60, the texture image data is transmitted to the external computer 4 connected to the network 9.

By realizing the functions as described above, the CPU 10 generates three-dimensional model data 70 from the original three-dimensional model data 51. The three-dimensional model data 70 includes texture image data 71 and three-dimensional shape data 72. The texture image data 71 is the above-described texture image data, that is, image data in which the projected texture image and the unprojected texture image are associated with each other. The three-dimensional shape data 72 is shape data expressing the surface shape of a three-dimensional model. The surface shape of the three-dimensional model is expressed by a plurality of polygons. Each polygon expresses the surface shape in each position in the three-dimensional model.

In the embodiment, by the data processing of the CPU 10, the three-dimensional shape expressed by each polygon is not changed but information regarding the correspondence relation with the texture image, which is held in the polygon information of each polygon, is changed. Specifically, in a process where the CPU 10 performs the data processing, the original shape data 51a included in the original three-dimensional model data 51 is obtained, and texture specifying information included in the polygon information of each polygon is updated so as to correspond to a texture image newly generated (the projected texture image and the unprojected texture image). As a result, the new three-dimensional shape data 72 indicative of the shape which is the same as the shape expressed by the original shape data 51a is generated, and in the polygon information of the three-dimensional shape data 72, the correspondence relation with the texture image indicated by the texture image data 71 newly generated is indicated.

By executing the texture image generating program 52 by the CPU 10, the new three-dimensional model data 70 is generated from the original three-dimensional model data 51. The three-dimensional model data 70 includes the texture image data 71 and the three-dimensional shape data 72. The texture image data 71 and the three-dimensional shape data 72 are managed as integrated data, thereby enabling the three-dimensional model to be properly displayed.

The detailed data processing sequence and the contents of the data processing when the texture image generating program 52 is executed in the three-dimensional data processing apparatus 1 configured as described above will now be described.

FIGS. 3 to 6 are flowcharts showing the sequence of the texture image generating process in the three-dimensional data processing apparatus 1.

First, when the texture image generating program 52 is executed in the CPU 10, the texture image generating conditions are inputted via the operation input unit 30 (step S1). On the basis of the input information which is inputted at this time, the texture image generating conditions are set. In the case where a plurality kinds of original three-dimensional model data 51 is stored in the storage unit 50, in step S1, the user designates the original three-dimensional model data 51 as an object of the texture image generating process to be executed from the plurality kinds of data.

Figure 7:
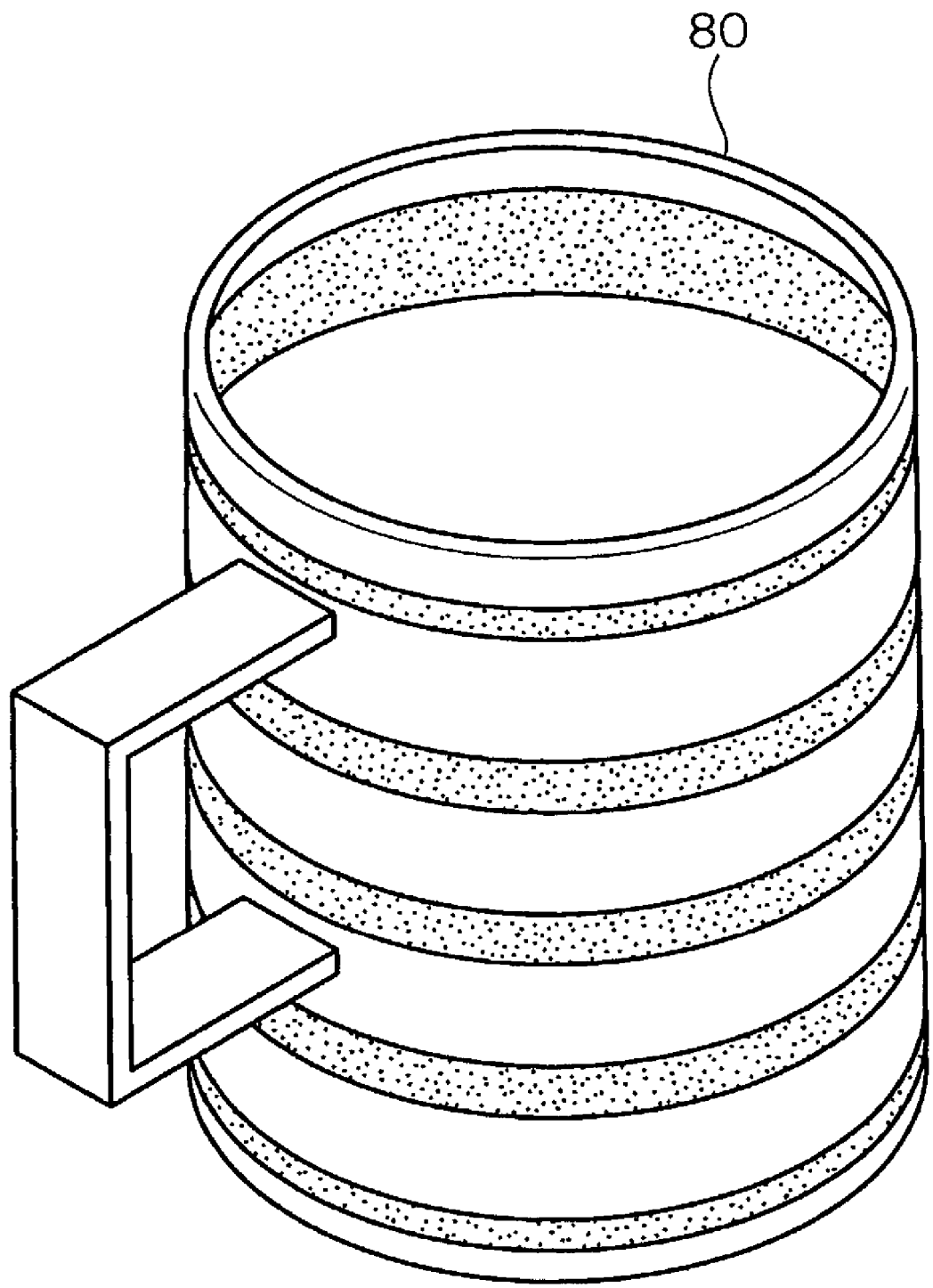
FIG. 7 is a diagram showing an example of an original three-dimensional model.

The virtual model space setting unit 12 reads the original three-dimensional model data 51 designated by the user from the storage unit 50 (step S2). FIG. 7 is a diagram showing an example of an original three-dimensional model 80. In the following, the case where the original three-dimensional model 80 in which a lateral line pattern is formed on the surface of a cup shape as shown in FIG. 7 is used an object of the data process will be described.

In step S3, the virtual model space setting unit 12 sets a virtual model space and sets the original three-dimensional model 80 in the virtual model space on the basis of the original shape data 51a.

The projection plane setting unit 13 sets a cylindrical plane as the projection plane for virtually projecting the three-dimensional model 80 in the virtual model space on the basis of the conditions set by the texture image generating condition setting unit 11 (step S4).

FIG. 8 is a diagram showing an example of the cylindrical plane which is set for the three-dimensional model 80. As shown in FIG. 8, the projection plane setting unit 13 sets a cylinder axis 83 in the virtual model space 3 and an end portion 82 used at the time of developing the cylindrical plane on the basis of the conditions designated by the texture image generating condition setting unit 11, thereby setting a cylindrical plane 81 as a projection plane.

The projection plane setting unit 13 sets a projection image according to the resolution set by the texture image generating condition setting unit 11 in the cylindrical plane 81 set in the virtual model space 3 (step S5). The projection image is an image used to generate a projection texture image and is set in an initial state where the image does not have any effective image components (that is, a state of no image) in step S5.

Desirably, the texture image generating condition setting unit 11 preliminarily analyzes the ratio between the size in the vertical direction and the size in the lateral direction of the original three-dimensional model 80, frequency components and the like and, on the basis of the analysis results, determines the resolution of a projected image. The present invention, however, is not limited to such a determining method but the user may manually set conditions.

In a state where the process in step S5 is finished, the preparation for virtually projecting the original three-dimensional model 80 onto the projection plane is completed.

The program advances to step S6 where the virtual projection computing unit 14 functions in the CPU 10, and a projected texture image generating process is performed. The flowchart of FIG. 4 shows the detailed sequence of the projected texture image generating process. In the projected texture image generating process, the process is performed on each of the polygons constructing the original three-dimensional model 80.

First, the virtual projection computing unit 14 selects one of the polygons constructing the original three-dimensional model 80 as a polygon to be processed (referred to as "target polygon") (step S601). By converting the coordinate value at each vertex of the target polygon into the position in the projection plane, the target polygon is virtually projected onto the projection plane (step S602).

Figure 9:
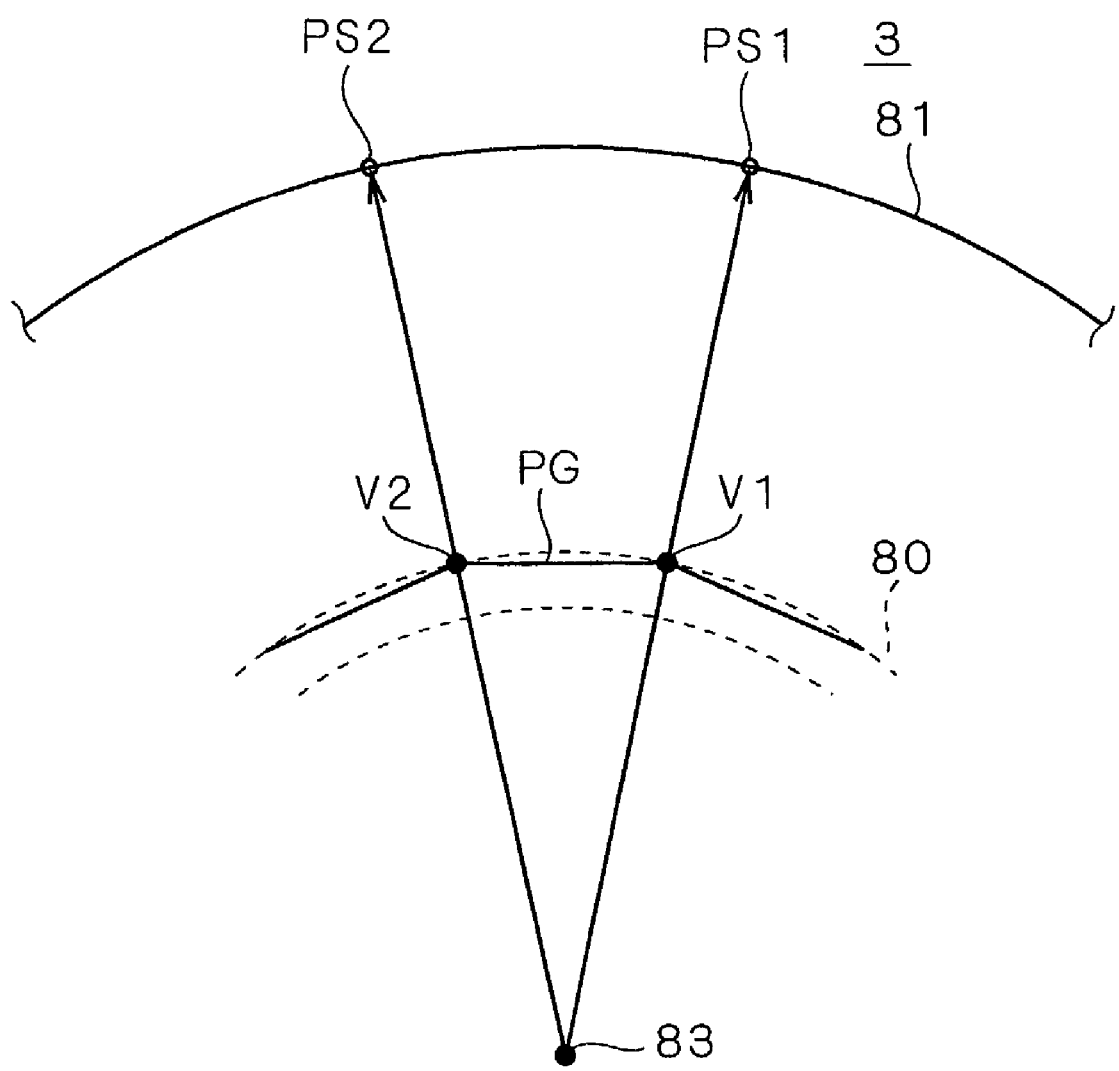
FIG. 9 is a diagram showing the concept of a virtual projecting process.

FIG. 9 is a diagram showing the concept of the virtual projecting process and illustrating the virtual model space 3 from above. As shown in FIG. 9, vertexes V1 and V2 forming a target polygon PG are taken into consideration. In order to express a micro plane in the virtual model space 3, at least three vertexes are necessary to form a polygon. In FIG. 9, for simply describing, the target polygon is expressed by two vertexes.

The virtual projection computing unit 14 computes a projection point PS1 of the vertex V1 by extending a straight line connecting the vertex V1 of the target polygon PG and one point on the cylinder axis 83 to the cylindrical plane 81. Similarly, the virtual projection computing unit 14 computes a projection point PS2 of the vertex V2 by extending a straight line connecting the vertex V2 of the target polygon PG and one point on the cylinder axis 83 to the cylindrical plane 81. As a result, an area in which the target polygon PG is projected onto the projection plane can be specified.

In step S603, the virtual projection computing unit 14 determines whether the surface side of the target polygon projected on the projection plane faces the projection plane or not. Generally, a texture image is pasted to the surface side of a polygon, not to the rear side. Consequently, by determining whether the surface side of the target polygon is directed to the outer side direction of the projection plane or not when the target polygon is projected onto the projection plane, whether the surface side of the target polygon faces the projection plane or not is specified.

For example, in the case of the cup shape as shown in FIG. 7, the outer surface of the cup is directed to the outer side direction of the projection plane, so that the surface of each of the polygons constructing the cup outer shape faces the projection plane. However, the inner face of the cup is directed to the inner side direction of the projection plane, so that the surface of each of the polygons constructing the cup inner shape does not face the projection plane.

In the case where the surface of a target polygon and the projection plane face each other, the program advances to step S604. If not, the program advances to step S606. In the case where the program advances to step S606, the virtual projection computing unit 14 sets the target polygon as a polygon which cannot be projected onto the projection plane, that is, as an unprojected polygon.

In step S604, whether or not an image has been already written in an area corresponding to the projection position of the target polygon in a projection image for generating a projection texture image is determined. That is, whether or not another texture image is already written in the same image area is determined by checking whether another polygon has been processed as a target polygon. If "YES", the polygon corresponding to the already written texture image and the target polygon are to be projected to the same position on the projection plane, so that one of the polygons exists in the position in the shade of another polygon.

Consequently, in the case where step S604 is determined positively ("YES"), a hidden surface determining process for setting the polygon in the shade as an unprojected polygon is performed in steps S605 to S608. The hidden surface determining process is a process of determining a portion corresponding to the target polygon as a projectable portion when another polygon does not exist between the position of the target polygon in the virtual model space 3 and the projection position in the projection plane of the target polygon, and determining a portion corresponding to the target polygon as an unprojectable portion in the case where another polygon exists. In the embodiment, concretely, the hidden surface determining process is realized by performing the following processes.

First, in step S605, whether the target polygon is hidden behind the processed polygon or not is determined.

FIG. 10 is a diagram showing the concept of the hidden surface determining process, which illustrates the virtual model space 3 from above. In the three-dimensional model 80 of a cup shape, a polygon PG1 which is a component of the cup outer shape and in the shade of a grip portion and a polygon PG2 in the outer face of the grip portion are considered. In this case, as shown in FIG. 10, the projection position of the polygon PG1 and that of the polygon PG2 are the same position on the cylindrical plane 81. Consequently, in order to determine which polygon is a hidden polygon, in the embodiment, the distance between each of the polygons and the cylinder axis 83 as a projection reference position is considered.

For example, when the target polygon is the polygon PG1, the distance between the cylinder axis 83 and the polygon PG1 is obtained as R1, and the distance between the cylinder axis 83 and the polygon PG2 is obtained as R2. When the distances R1 and R2 are compared with each other, it is determined that the polygon having a smaller value is hidden behind the polygon having a larger value.

Therefore, the virtual projection computing unit 14 obtains the distance between the target polygon and the cylinder axis and also the distance between the polygon corresponding to a texture image already written in the projection image and the cylinder axis and determines the relation between the distances, thereby determining whether the target polygon is hidden behind the processed polygon or not.

In order to improve the processing efficiency, preferably, when a processed polygon is the target polygon, the distance R between the polygon and the cylinder axis 83 is obtained in advance. At the time of overwriting a corresponding texture image on the projection image, the data of distance from the cylinder axis 83 is temporarily stored as attachment data of the projection image. By performing such a process, it becomes unnecessary to repeat the computation of obtaining the distance R with respect to the same polygon. Thus, the processing efficiency is improved.

In the case where it is determined in the process of step S605 that the target polygon is hidden behind the processed polygon, the program advances to step S606 where the target polygon is set as an unprojected polygon.

On the other hand, in the case where it is determined in the process of step S605 that the target polygon is not hidden behind the processed polygon, the processed polygon is hidden behind the target polygon. Therefore, the virtual projection computing unit 14 sets the processed polygon as an unprojected polygon in step S607, and the program advances to step S608.

In the case where an image has not been yet written on the projection image corresponding to the target polygon (in the case where step S604 is determined as "NO"), or in the case where it is determined that the processed polygon is hidden behind the target polygon, in step S608, the virtual projection computing unit 14 obtains a unit texture image corresponding to the target polygon and overwrites it in a portion corresponding to the projection image. At this time, the virtual projection computing unit 14 calculates the distance R between the target polygon in the virtual model space 3 and the cylinder axis 83 as described above, and temporarily stores the distance R as attachment data of the projection image.

After that, the program advances to step S609. In the case where the target polygon is set as an unprotected polygon in step S606, the program advances to step S609 without performing the process in step S608.

In step S609, the virtual projection computing unit 14 determines whether the process on all of polygons constructing the three-dimensional model 80 has been finished or not. When an unprocessed polygon exists, the program returns to step S601 where the process is performed on another polygon as an object to be processed. On the other hand, when no unprocessed polygon exists, it means that texture images corresponding to all of the polygons which can be projected are written in the projection image, so that the projection texture image generating process (step S6) is finished. The program advances to step S7 in FIG. 3 and an unprojected texture image generating process is performed.

Figure 5:
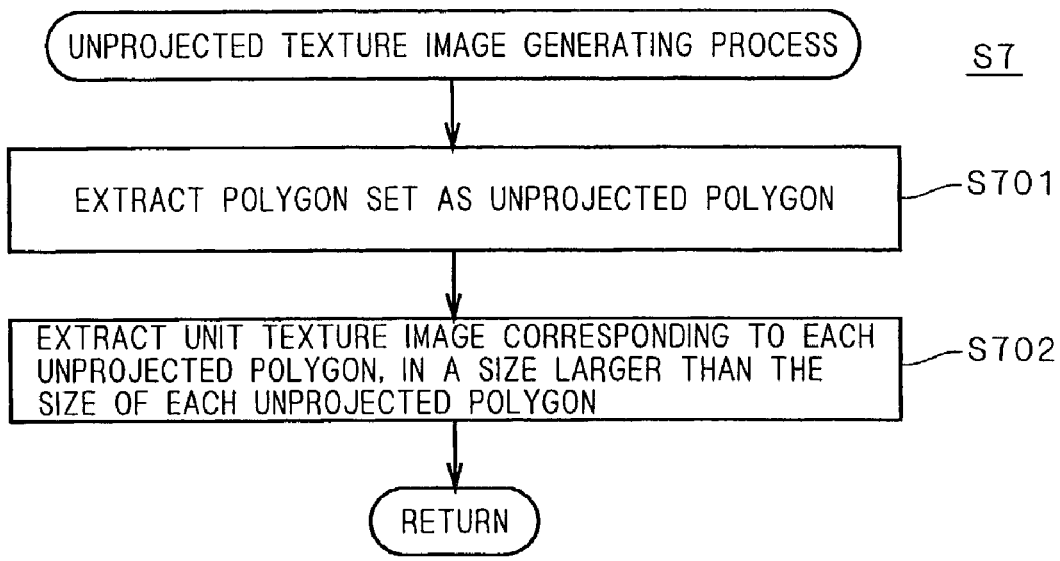
FIG. 5 is a flowchart showing the sequence of the texture image generating process.

The flowchart of FIG. 5 shows the detailed sequence of the unprojected texture image generating process. First, the virtual projection computing unit 14 extract all of polygons which are set as unprojected polygons in the projection texture image generating process (step S6) (step S701).

The virtual projection computing unit 14 extracts a unit texture image associated with an unprojected polygon in a size larger than the size of each unprojected polygon (step S702). FIGS. 11 to 13 are diagrams showing the concept of extracting a texture image corresponding to an unprojected polygon.

First, when a polygon PGa has a rectangular shape as shown in FIG. 11, at the time of extracting a unit texture image corresponding to each polygon, a texture image TX1 having an image size larger than that of the polygon PGa is extracted. The texture image TX1 is extracted as a rectangular of the same shape as the polygon PGa.

When a polygon PGb has a triangle shape as shown in FIG. 12, at the time of extracting a unit texture image corresponding to each polygon, a texture image TX2 having an image size larger than the size of the polygon PGb is extracted. At this time, the texture image TX2 is extracted as a rectangle including the polygon PGb. When the polygon PGb has a triangle shape, the triangle shape of a polygon differs according to the three-dimensional shape. Consequently, even when the texture image corresponding to the polygon is extracted in a triangular shape similar to the polygon shape, a gap generates between the texture images at the time of disposing them. Therefore, even if the polygon PGb has a triangle shape, by extracting the texture image as a rectangle, the texture images can be disposed later without a gap.

Figure 13A:
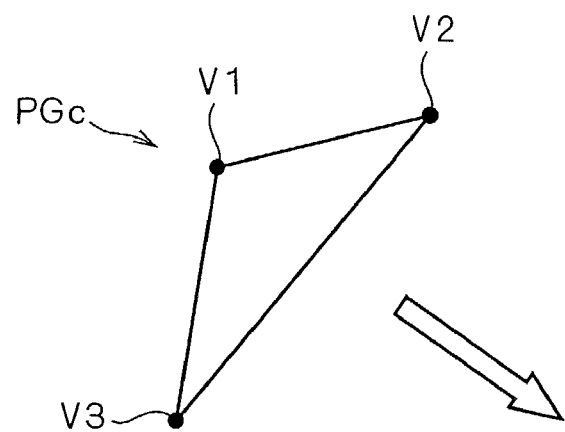
FIGS. 13A and 13B are diagrams showing respectively an example of the concept of extraction of a texture image corresponding to an unprojected polygon.
Figure 13B:
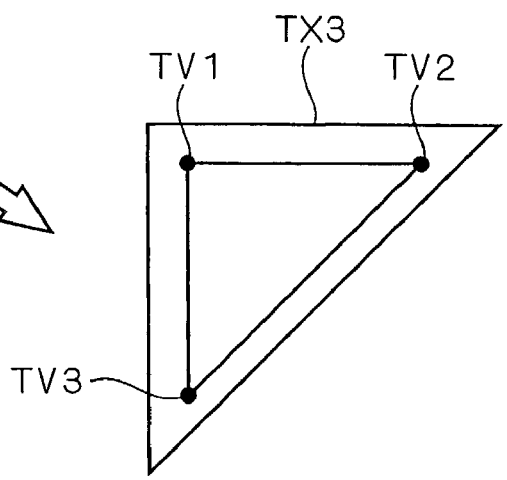

Alternately, as shown in FIGS. 13A and 13B, a polygon PGc having a triangle shape may be extracted as a texture image TX3 of a right-angled triangle. Although there may be a case where the shape of the polygon PGc itself does not have a right-angled triangle as shown in FIG. 13A, in such a case, by associating the vertexes V1, V2 and V3 of the polygon PGc with points TV1, TV2 and TV3 in the texture image TX3 and performing a mapping process so as to obtain a texture image of a right-angled triangle pixel by pixel, the texture image TX3 having a right-angled triangle can be generated. When such a method of generating the texture image TX3 is employed, even if the sizes of polygons are different from each other, the sizes of the texture images TX3 can be adjusted to the same size and it becomes more preferable when a plurality of texture images TX3 are arranged.

Figure 3:
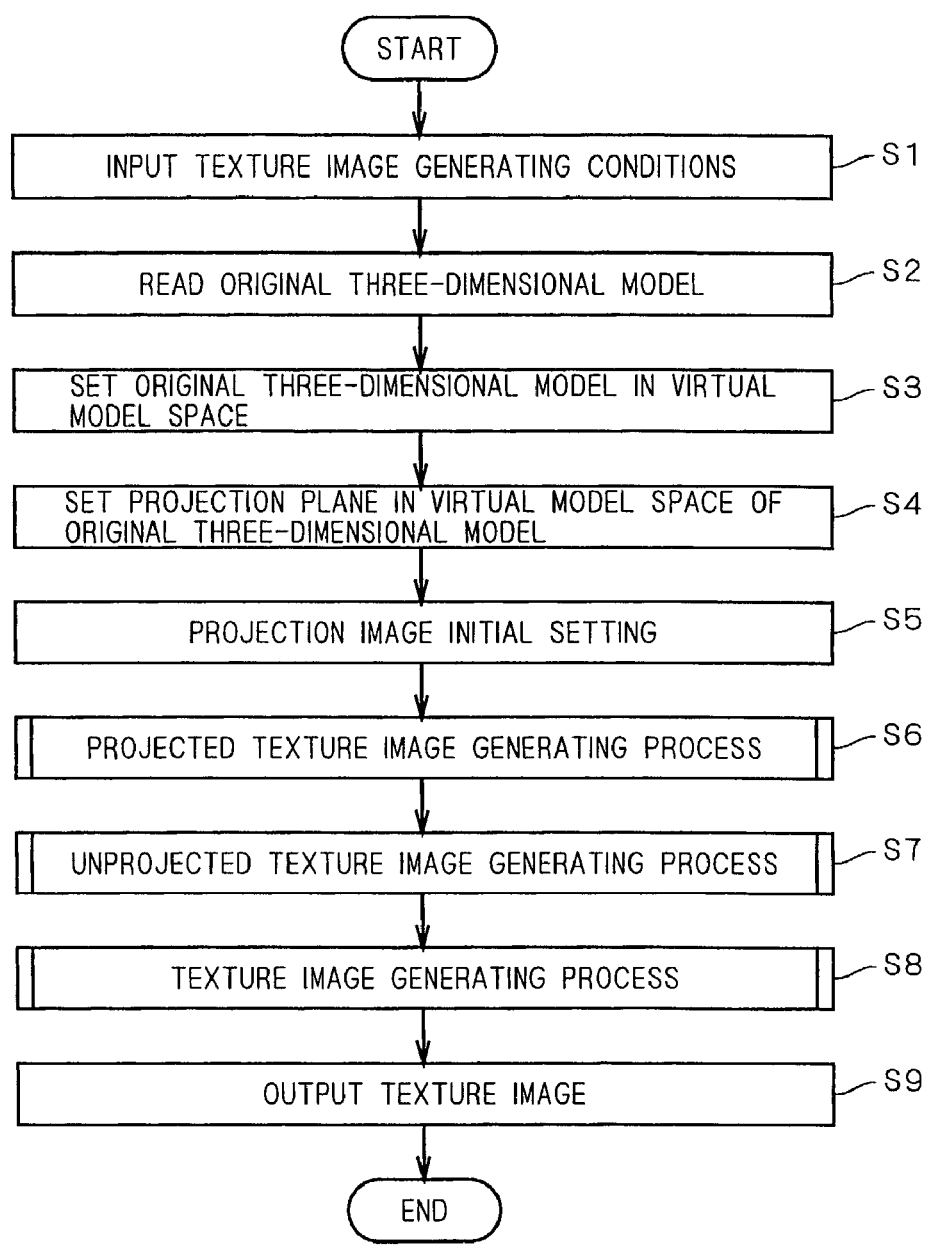
FIG. 3 is a flowchart showing the sequence of a texture image generating process.

After the process of extracting texture images corresponding to all of polygons set as unprojected polygons is finished, the program advances to step S8 in FIG. 3 where the texture image generating process is performed.

Figure 6:
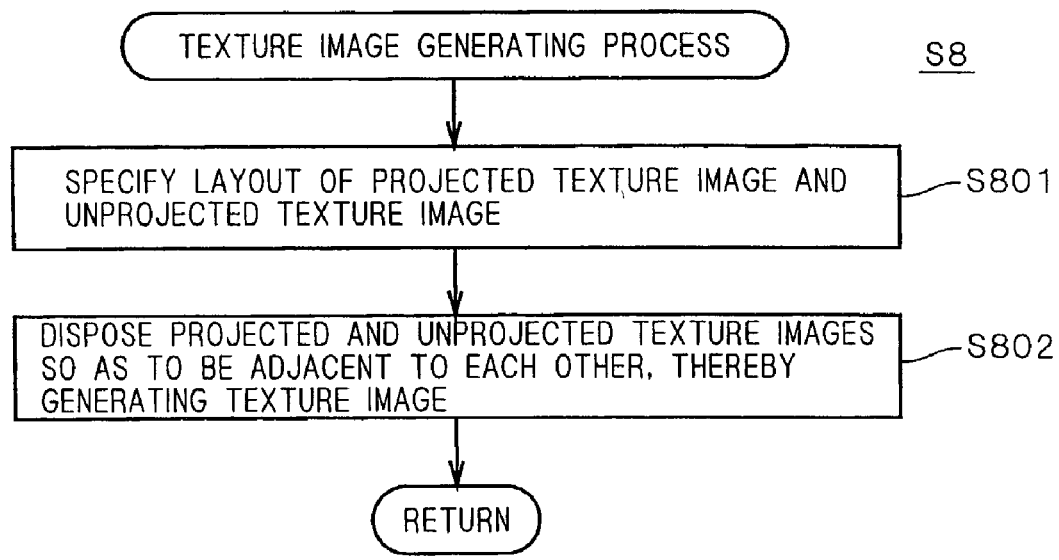
FIG. 6 is a flowchart showing the sequence of the texture image generating process.

The flowchart of FIG. 6 shows the detailed sequence of the texture image generating process. First, when the program advances to the texture image generating process, the image disposing unit 15 functions in the CPU 10 to specify the layout of projected texture images and unprojected texture images, which is set as a texture image generating condition (step S801). On the basis of the specified layout, the projected texture image and the unprojected texture image are disposed adjacent to each other, thereby generating a texture image as one two-dimensional image (step S802).

FIGS. 14 to 17 are diagrams each showing a layout of a projected texture image 91 and an unprojected texture image 92 in a texture image 90.

First, FIG. 14 shows a layout in which unit texture images each having a rectangular shape are extracted as unprojected texture images 92 and disposed on the bottom of the projected texture images 91. The sizes of the rectangular unit texture images in the unprojected texture images 92 in FIG. 14 are different from each other because the sizes of the unprojected polygons are different from each other.

FIG. 15 shows a layout in which unit texture images each having a predetermined right-angled triangle shape are extracted as the unprojected texture images 92, and the unprojected texture images 92 are disposed on the bottom of the projected texture images 91.

Although FIGS. 14 and 15 show the layouts in each of which the unprojected texture images 92 are disposed on the bottom of the projected texture image 91, the unprojected texture images 92 may be disposed on the projected texture images 91 or on the right or left side of the projected texture image 91. Further, the unprojected texture images 92 may be disposed around the projected texture image 91.

FIG. 16 is a diagram showing the texture image 90 in which the unprojected texture images 92 are disposed on the right side of the projected texture image 91. For example, when the original three-dimensional model 80 has a shape which is long in the vertical direction, the projected texture image 91 becomes long in the vertical direction. Consequently, it is preferable that the unprojected texture images 92 is positioned on a side of the projected texture image 91.

Generally, in the case of displaying the texture image 90 by a computer or the like, software for viewer of a two-dimensional image is started in the computer, and the texture image 90 is displayed on the display screen of the computer by the function of the software for viewer. Depending on the kind of the software for viewer to be activated, if the texture image 90 is not generated in a shape close to a square, a texture image may not be properly displayed in some cases. In the case where the original three-dimensional model 80 has a shape which is long in the vertical direction, it is preferable to generate a texture image in which the unprojected texture image 92 is disposed on a side of the projected texture image 91 as shown in FIG. 16.

In the case where the original texture image of the original three-dimensional model 80 is examined in the vertical and lateral directions to preliminarily obtain frequency components in the vertical and lateral directions. In the case where frequency components having a predetermined frequency or higher are contained at a predetermined ratio or higher in the frequency distribution in each direction, it is desired to increase the resolution of the projected image in the direction. For example, in the case where each of horizontal stripes formed on the surface of the cup shape of the original three-dimensional model 80 shown in FIG. 7 is a considerably narrow line, if the resolution in the vertical direction in the projected image is lowered, there is the possibility that texture information regarding the narrow line drops out. In such a case, the frequency components in the vertical direction in the original texture image include many high frequency components. Consequently, by increasing the resolution in the vertical direction in the projected image which is set on the projection plane, at the time of generating the projection texture image 91, a dropout of the texture information regarding the narrow line can be prevented.

In such a case as well, the projected texture image 91 becomes an image which is long in the vertical direction. It is therefore preferable that the unprojected texture image 92 be positioned on a side of the projected texture image 91 as shown in FIG. 16. That is, by changing the disposing position of the unprojected texture image 92 with respect to the projected texture image 91 in accordance with resolutions in the vertical and lateral directions of the projected image set by the texture image generating condition setting unit 11, a more preferable texture image 90 is generated.

Figure 17:
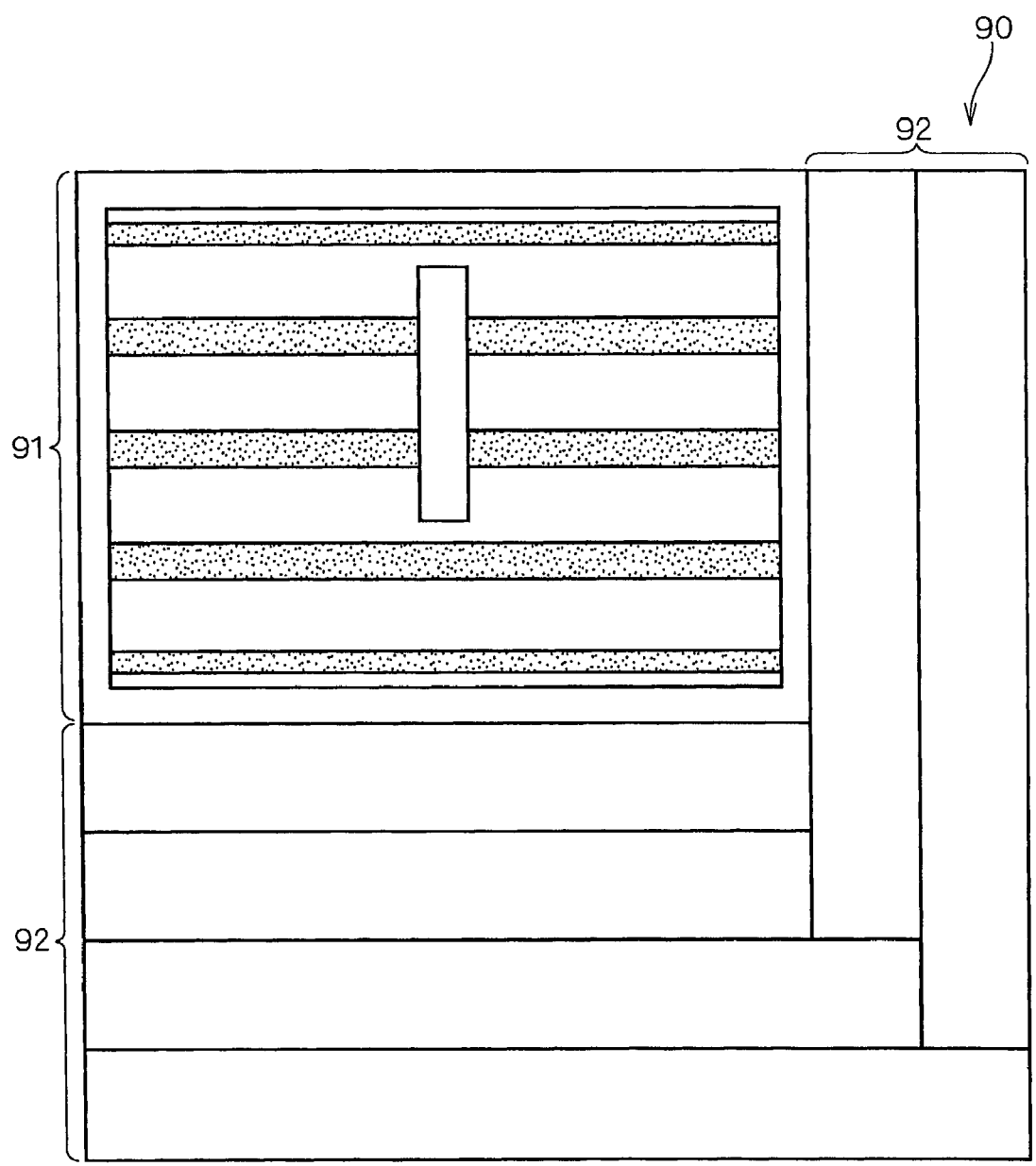
FIG. 17 is a diagram showing an example of layout of a projected texture image and an unprojected texture image.

FIG. 17 is a diagram showing the texture image 90 in which the unprojected texture images 92 are disposed on the bottom and right sides of the projected texture image 91. As described above, there is a case where the texture image 90 is desired to be an image having a shape close to a square at the time of displaying the texture image 90 in a computer. As shown in FIG. 17, therefore, by disposing the unprojected texture images 92 on the bottom and right sides of the projected texture image 91, the texture image 90 having a shape closer to a square can be generated.

A method of generating the texture image 90 as shown in FIG. 17 may be carried out as follows. At the time of disposing the unprojected texture images 92 in the periphery of the projected texture image 91, the length in the vertical direction and that in the lateral direction of the texture image 90 are compared with each other. If the length in the vertical direction is shorter, the unprojected texture images 92 are disposed so as to increase the length in the vertical direction. If the length in the lateral direction is shorter, the unprojected texture images 92 are disposed so as to increase the length in the lateral direction.

By setting the projection plane for the original three-dimensional model 80 and virtually projecting the original texture image onto the projection plane, the projected texture image 91 is generated. A texture image which cannot be projected to the projection plane is generated as the unprojected texture image 92. The texture image 90 is generated so that the projected texture image 91 and the unprojected texture image 92 are dealt as integrated data, thereby enabling the texture image 90 of the original three-dimensional model 80 to be generated without a dropout.

The texture image 90 is generated in such a manner, thereby generating the texture image data 71. At this time, new three-dimensional model data 70 is generated.

The program advances to step S9 in FIG. 3 where the image disposing unit 15 outputs the texture image data 71 to the storage unit 50, the image displaying unit 20, the recording medium data input/output unit 40 or a communication interface 60. In the case where the texture image data 71 is outputted to the network 9 via the communication interface 60, the data is outputted by designating the external computer 4 as a destination. As a result, the external computer 4 can obtain new three-dimensional model data 70 including the texture image data 71 generated by the three-dimensional data processing apparatus 1.

After that, the processes in the three-dimensional data processing apparatus 1 in the embodiment are finished.

By performing the processes as described above, the texture image 90 of the original three-dimensional model 80 can be generated without a dropout.

By managing the texture image 90 by the two kinds of images of the projected texture image 91 and the unprojected texture image 92, the image in the portion which can be projected to the projection plane can be easily visually recognized at the time of image display. There is also such an advantage that the user can easily perform an operation of editing or correcting an image by starting software of image edition or the like.

When a unit texture image corresponding to an unprojected polygon is extracted, an image area larger than the size of an unprojected polygon is extracted and the unprojected texture image 92 is generated. Consequently, generation of a dropout around the boundary of polygon at the time of pasting each of the unit texture images of the unprojected texture image 92 to each of the polygons can be prevented, and a three-dimensional model can be excellently reproduced from the texture image 90 generated as described above.

Since the texture image is generated by the projected image with respect to the polygon which can be projected to the projection plane, the data size of the whole texture image can be made smaller as compared with the case of extracting the unit texture image of a size larger than the size of each polygon with respect to all of the polygons and generating a texture image. Thus, data management and data transmission/reception of a texture image is facilitated.

Although the embodiment of the present invention has been described above, the present invention is not limited to the above-described contents.

Although the example of setting the cylindrical plane 81 as a projection plane has been described above, the present invention is not limited to the cylindrical plane, but a projection plane such as a spherical surface or polyhedron may be set.

Figure 18:
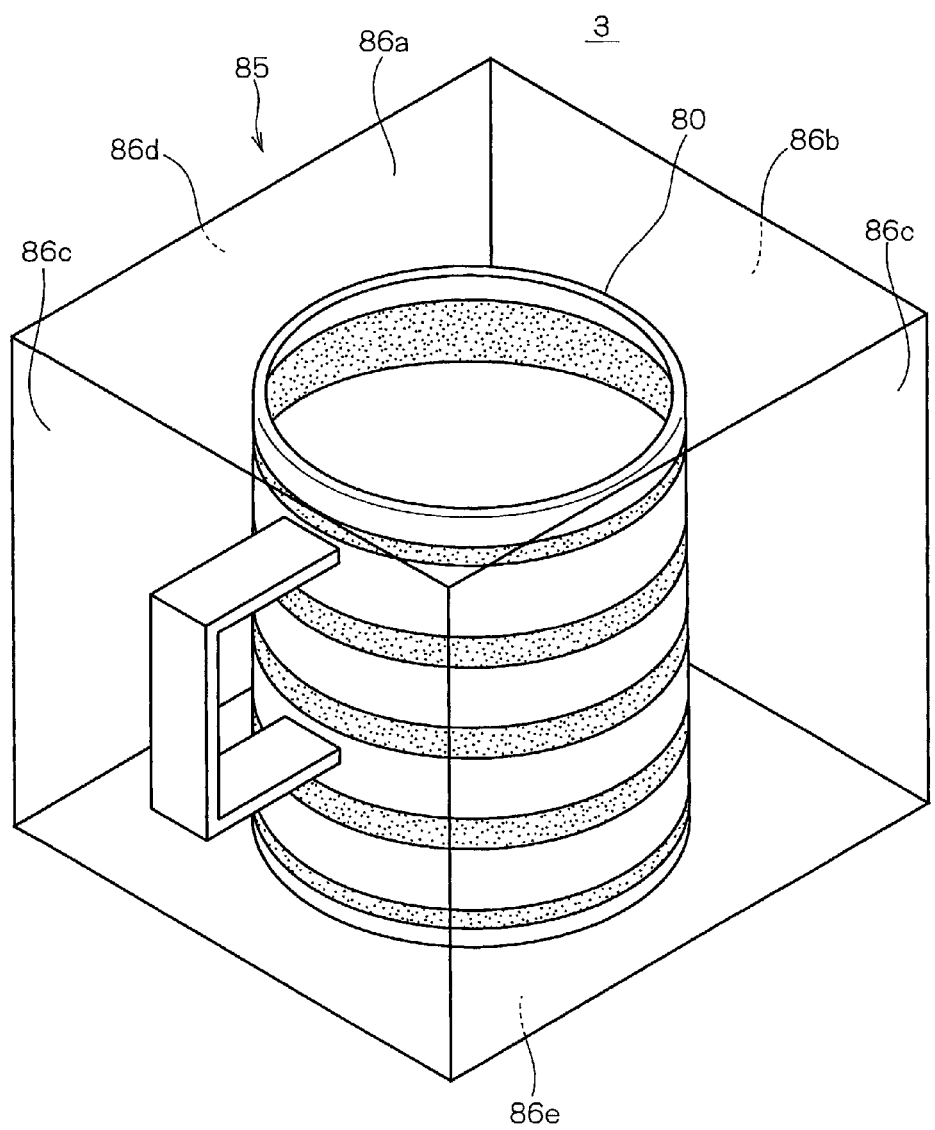
FIG. 18 is a diagram showing a hexahedron constructed by projection planes.

FIG. 18 is a diagram showing a hexahedron constructing the projection planes. As shown in FIG. 18, the original three-dimensional model 80 is surrounded by a hexahedron 85, each of faces 86a to 86e of the hexahedron 85 is set as a projection plane, and virtual projection may be performed. In this case, a texture image of a polygon virtually projected on any of the projection faces is included in any of the six projected texture images. A texture image of a polygon which cannot be projected to any of the projection faces is generated as an unprojected texture image.

Although the case where the projected texture image 91 and the unprojected texture image 92 are associated with each other so as to be handled as integrated image data by forming one texture image 90 from the projected and unprojected texture images 91 and 92 has been described above, it is not always necessary to generate one texture image by integrating the projected and unprojected texture images 91 and 92. That is, when the projected texture image and the unprojected texture image are associated with each other so as to be handled as integrated image data, the images may be managed as different image data.

Although the example of performing all of processes in the three-dimensional data processing apparatus 1 as a single computer connected to the network 9 has been described above, the present invention is not limited to the example. For example, the above-described processes may be executed by a plurality of computers connected to the network 9.

While the invention has been shown and described in detail, the foregoing description is in all aspects illustrative and not restrictive. It is therefore understood that numerous modifications and variations can be devised without departing from the scope of the invention.

What is claimed is:

1. A data processing apparatus for generating and developing a texture image to an image in a plane from an original three-dimensional model having surface texture, comprising:
   a projection plane setting unit for setting a projection plane on which an original texture image of said original three-dimensional model is to be projected in a virtual model space of said original three-dimensional model;
   an image computing unit for generating a projected texture image by virtually projecting a part which can be projected onto said projection plane, in said original texture image onto said projection plane, and generating an unprojected texture image by extracting a part which cannot be projected onto said projection plane, in said original texture image; and
   an image placing unit for associating said projected and unprojected texture image with each other.

2. The data processing apparatus according to claim 1, wherein
   said image placing unit associates said projected and unprojected texture image with each other by placing said projected and unprojected texture images so as to be adjacent to each other.

3. The data processing apparatus according to claim 2, further comprising:
   an operation input unit for setting a generating condition at the time of generating said texture image, said generating condition including settings regarding the projection plane and resolution at the time of virtually projecting said original three-dimensional model, wherein
   when resolution, at the time of virtually projecting said original three dimensional model onto said projection plane by said operation input unit, is set, said image placing unit changes a position, in which said unprojected texture image is placed relative to said projected texture image, in accordance with the set resolution.

4. The data processing apparatus according to claim 1, further comprising:
   a display unit for receiving said projected and unprojected texture images which are associated with each other from said image placing unit, and displaying said projected and unprojected texture images.

5. The data processing apparatus according to claim 1, further comprising:
   a recording medium input/output unit for receiving said projected and unprojected texture images which are associated with each other from said image placing unit, and storing said projected and unprojected texture images into a recording medium.

6. The data processing apparatus according to claim 1, further comprising:
   a communication, interface connected to an external computer via a network, the communication interface receiving said projected and unprojected images which are associated with each other from said image placing unit and transmitting said projected and unprojected texture images to said external computer via said network.

7. A computer-readable program product for generating and developing a texture image to an image in a plane from an original three-dimensional model having surface texture, comprising the instructions of:
   setting a projection plane on which an original texture image of said original three-dimensional model is to be projected in a virtual model space of said original three-dimensional model;
   generating a projected texture image by virtually projecting a part which can be projected onto said projection plane, in said original texture image onto said projection plane;
   generating an unprojected texture image by extracting a part which cannot be projected onto said projection plane, in said original texture image; and
   associating said projected and unprojected texture images with each other.

8. The program product according to claim 7, further comprising the instruction of:
   after associating said projected texture image and said projected texture image with each other, outputting said projected and unprojected texture images associated with each other.

9. The program product according to claim 7, further comprising the instruction of:
   placing said projected and unprojected texture images so as to be adjacent to each other, thereby associating said projected and unprojected texture images with each other.

10. The program product according to claim 9, further comprising the instructions of:
    setting a generating condition at the time of generating said texture image, said generating condition including settings regarding the projection plane and resolution at the time of virtually projecting said original three-dimensional model; and
    when resolution at the time of virtually projecting said original three-dimensional model onto said projection plane is set, changing the placement position of said unprojected texture image relative to said projected texture image in accordance with the set resolution by said image placing unit.

11. Texture image data generated and developed to an image in a plane from an original three-dimensional model having surface texture, comprising:
    a projected texture image generated by virtually projecting a projectable part of an original texture image of said original three-dimensional model onto a projection plane set in a virtual model space of said original three-dimensional model; and
    an unprojected texture image generated by extracting a part which cannot be projected onto said projection plane, in said original texture image, thereby obtaining a data structure that said projected and said unprojected texture images are associated with each other.

12. The texture image data according to claim 11, wherein said projected and unprojected texture images are placed so as to be adjacent to each other, thereby obtaining a data structure in which said projected and unprojected texture images are associated with each other.

* * * * *